June 10, 1930. H. KRIEGSHEIM 1,762,784
TREATMENT OF BOILER WATER
Filed April 25, 1927
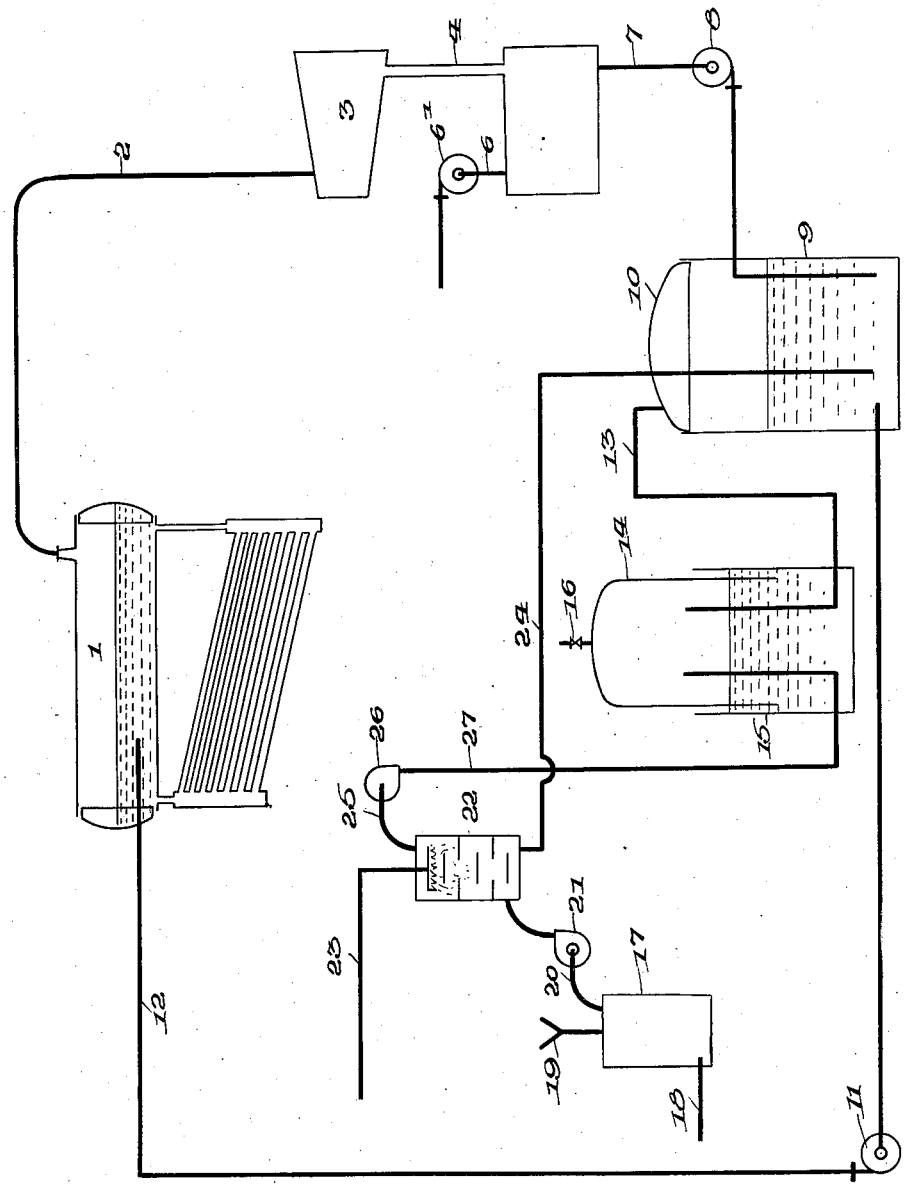
Inventor
Heinrich Kriegsheim,
By K. P. McElroy
Attorn Patented June 10, 1930

1,762,784

UNITED STATES PATENT OFFICE

HEINRICH KRIEGSHEIM, OF NEW YORK, N. Y., ASSIGNOR TO THE PERMUTIT COMPANY, OF NEW YORK, N. Y., A CORPORATION OF DELAWARE

TREATMENT OF BOILER WATER

Application filed April 25, 1927. Serial No. 186,445.

This invention relates to treatment of boiler water; and it comprises a method of treating and handling boiler water particularly applicable for plants using alkaline make-up water and equipped with condensing means wherein sulfur is burnt with the aid of a limited amount of air to get sulfur dioxid and nitrogen, the sulfur dioxid removed and taken up by make-up water to obviate its alkalinity and the residual nitrogen used in the storage of condensation water; all as more fully hereinafter set forth and as claimed.

In a prior Patent, No. 1,235,815, I have pointed out the importance of maintaining the concentration of dissolved salines in boiler water within certain limits in restricting and limiting corrosion. The character of the soluble matters constituting the salines in boiler water as well as their total quantity is a matter of some importance in this regard and, in practice, it is suggested that a ratio of about 2:1 between bodies of a neutral saline character, such as sodium sulfate, and bodies of a more pronounced basic character, such as carbonates, is desirable. In some plants, such a ratio is attained by adding small amounts of sulfuric acid to water containing basic bodies in solution; the addition being merely the quantity necessary to convert about two-thirds of the basic salines present into neutral salines. As the amount of salines in any ordinary water is extremely small, the quantity of sulfuric acid so added is also very small, being, as indicated, merely enough to convert about two-thirds of the salines present into neutral sulfates. Small as this addition is, its cost is an item and the inconvenience and risk in adding sulfuric acid to water in a boiler plant is also a factor.

In the ordinary course of operation of condensing steam plants, an art to which the present invention mainly relates, a large percentage of the boiler steam is recondensed and goes back to the boiler. The percentage of this water so regained may reach 90 to 95 per cent of the boiler demand, leaving only 5 to 10 per cent of fresh water, or "make-up water", to be added. The water given by condensation being pure is highly corrosive; and it tends to attack condensers and piping. In the ordinary routine, the condensed water is stored in a "hot well" in contact with the air from which it rapidly absorbs oxygen, making it much more aggressive towards iron and steel. Make-up water is added in the hot well. Sometimes the water en route to the feed water pump from the hot well is boiled or heated by open steam to free it of oxygen taken up in storage and that coming in with the make-up water and other less practical expedients have been proposed, such as bubbling nitrogen through it; but such manipulations add an additional complication and are otherwise not very satisfactory. It would be desirable in practice to preclude entrance of oxygen to the water in storage rather than try to remove it after it once gains access and this is one of the objects of the present invention, which provides an economical source of nitrogen which can be used to provide the atmosphere in contact therewith. It is a further object to provide, in connection with the manufacture of nitrogen for this purpose a method of cheaply and economically producing sufficient acid to change the character of the salines in the make-up water in the way desired without the cost, inconvenience and risk attendant on the use of sulfuric acid.

In the ordinary routine, as stated, sufficient make-up water is added to the boiler supply to replenish losses and the contained salines go into the boiler where they tend to accumulate, making it necessary to blow off or bleed off and discard some of the boiler water from time to time. It is desirable, as in the prior practice stated, that the salines gaining access to the boiler contain neutral salines. In nearly all natural water used for boilers, the salines are of predominantly basic character; the carbonates predominate. And in waters which have been softened by various commercial processes, such as the soda-lime process, the basic character of the water solubles is accentuated.

In the present process of simultaneously producing nitrogen for the protection of condensation water in the hot well and of acid for changing the character of the salines in the make-up water, I burn sulfur in any convenient or commercial type of sulfur burner, advantageously, however, using one wherein combustion is effected by about the theoretical amount of air. I do not desire excess air in the effluent gases from the burner. A type of burner in which there is, so to speak, a "reversed flame" of air burning in sulfur is quite suitable for my purposes. However, most ordinary burners can be supplied with air and sulfur in such a way as to accomplish the same result; substantially complete utilization of the oxygen of the air with production of flame gases consisting of a mixture of $SO_2$ (sulfur dioxid or sulfurous acid) and free nitrogen. In the present invention this mixture in any ordinary or suitable scrubbing apparatus is brought into contact with make-up water whereby its sulfur dioxide is abstracted and forms sulfites at the expense of the basic salines of the water. This operation is, of course, so regulated that the desired two-thirds of the basic salines are converted into sulfites. Sulfites, like sulfates, are neutral saline bodies and are not basic in the sense in which carbonates are basic.

The nitrogen remaining after scrubbing the products of combustion from the sulfur burner with make-up water, is led to a gasometer in open communication with the space above the liquid in the "hot well" used for condensed water. As water accumulates and rises in the hot well, the gas above is passed back to the gasometer and vice versa. In using nitrogen in this way, that is, flowing alternately between hot well and gasometer, it gradually becomes contaminated with oxygen from the water seal of the gasometer. In practice, however, it is found that by venting and replenishing gas from the gasometer, using for replenishment the nitrogen formed as described, the amount of acid necessary in salinification of the make-up water for the usual condensing steam plant will furnish sufficient nitrogen for the replenishment of gas in the gasometer to insure an ample body of substantially pure nitrogen at all times.

In the accompanying illustration, I have shown, more or less diagrammatically, apparatus suitable for use in the performance of the described process. In this showing, the view is in central longitudinal section of a complete plant, certain parts being shown in elevation. The figure is intended to illustrate the process and is therefore more in the nature of a flow sheet than a working drawing. No attempt has been made to indicate the actual construction of the usual elements of a power plant using condensing engines.

In the showing element 1 is a boiler of the usual type provided with steam line 2 leading to turbine 3. Exhaust from the turbine goes via pipe line 4 to condenser 5. As is usual, this condenser is provided with air line 6 leading to a dry air pump 6'. Condensed water is led off through line 7 and pump 8. to hot well 9. Usually the temperature of the water in the hot well is around 45° C; a temperature at which it is prone to take up oxygen if given an opportunity. The hot well is not an open construction, but is provided with dome 10, closing the water against access of air. From the hot well the water is returned to the boiler by the usual feed water pump 11 through line 12. Communicating with the air chamber above the water in the hot well is gas line 13 running to the bell 14 of an ordinary type of gasometer in water tank 15. The bell is provided with valved outlet 16 for venting a portion of the contained gas from time to time. A sulfur burner 17 of any desirable type is provided with air inlet 18 and means for supplying melted sulfur 19. Within the burner air and sulfur burn together, giving a mixture of sulfur dioxid an nitrogen (argon, etc.). These mixed gases are taken by line 20 and fan 21 to the base of scrubbing tower 22 wherein they are passed in countercurrent to make-up water gaining access through line 23. The make-up water, now acidified to the extent desired, is taken from the base of the scrubber by line 24 and sent to the hot well (9). The scrubbed gases now freed of sulfur dioxid leave the top of the tower through line 25 and are taken by fan 26 and line 27 to the bell of the gasometer.

With a constant flow of make-up water through the scrubber, the amount of $SO_2$ to be added is also constant and is determined by the nature and amount of salines present. Adjustment of the burner and its accessory elements only becomes necessary in the event of a change in the water. In this connection it may however be noted that attention must be paid to the salines gaining access to the boiler in the condensation water as well as to those in the raw water. Condensers ordinarily permit some leakage of raw water with its contained salines into the condensation water.

What I claim is:

1. In handling condensation water of a condensing steam plant en route to the boiler the process which comprises maintaining a blanketing layer of nitrogen over exposed water surfaces.

2. In handling condensation water of a condensing steam plant en route to the boiler the process which comprises maintaining a blanketing layer of inert gases over exposed water surfaces, said gases being scrubbed gases coming from a sulfur burner.

3. In handling condensation water of a condensing steam plant the process which comprises storing condensation water en route to the boiler in an atmosphere of gases produced by scrubbing the gases from a sulfur burner, the liquid used in scrubbing being make-up water en route to the boiler.

4. In handling water in a condensing steam plant, the process which comprises burning sulfur with air in about the calculated proportion, removing $SO_2$ from the resulting gases by make-up water, the amount of sulfur so burned being so proportioned to the volume of the make-up water and its composition as to convert a fraction but not all of the salines present into sulfites, passing the treated make-up water to the boiler supply and passing the scrubbed gases left after abstraction of the acid into contact with hot condensation water.

5. In the treatment of water in a boiler plant the process which comprises passing gases from a sulfur burner containing $SO_2$ into make-up water going to the boiler and containing basic bodies, the proportion of $SO_2$ passed into such water being sufficient to form neutral sulfite with some of the base present but insufficient to react with all or to form acid sulfites.

In testimony whereof, I have hereunto affixed my signature.

HEINRICH KRIEGSHEIM.